United States Patent
Aruga

(10) Patent No.: US 8,366,225 B2
(45) Date of Patent: Feb. 5, 2013

(54) IMAGE RECORDING APPARATUS, ITS CONTROL METHOD AND STORAGE MEDIUM RECORDING ITS CONTROL PROGRAM

(75) Inventor: Toshinao Aruga, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 781 days.

(21) Appl. No.: 12/498,660

(22) Filed: Jul. 7, 2009

(65) Prior Publication Data
US 2010/0015323 A1    Jan. 21, 2010

(30) Foreign Application Priority Data
Jul. 16, 2008  (JP) ................................. 2008-185416

(51) Int. Cl.
  B41J 29/38  (2006.01)
  C23C 16/52  (2006.01)

(52) U.S. Cl. ......... 347/12; 347/5; 347/6; 347/8; 347/14; 347/16; 347/101; 347/104; 347/105; 347/106; 427/8

(58) Field of Classification Search .................. 347/5–6, 347/8, 12, 14, 16, 101, 104–106; 427/8
See application file for complete search history.

(56) References Cited

U.S. PATENT DOCUMENTS

| | | | |
|---|---|---|---|
| 5,642,145 A * | 6/1997 | Tanaka et al. ................. | 347/111 |
| 6,213,659 B1 * | 4/2001 | Elgee ........................... | 400/633 |
| 6,234,606 B1 * | 5/2001 | Suzuki .......................... | 347/43 |
| 6,527,360 B2 * | 3/2003 | Otsuki et al. ................... | 347/19 |
| 7,271,819 B2 * | 9/2007 | Matsutani et al. .............. | 347/196 |
| 7,651,188 B2 * | 1/2010 | Otsuki ........................... | 347/19 |
| 2005/0219350 A1 * | 10/2005 | Matsutani et al. ............. | 347/211 |
| 2006/0055718 A1 * | 3/2006 | Endo et al. ..................... | 347/14 |
| 2006/0114281 A1 * | 6/2006 | Otsuki ............................ | 347/19 |
| 2007/0176955 A1 * | 8/2007 | Yoshida .......................... | 347/16 |

FOREIGN PATENT DOCUMENTS
JP    2001-096874 A    4/2001

* cited by examiner

Primary Examiner — Ryan Lepisto
Assistant Examiner — Guy Anderson
(74) Attorney, Agent, or Firm — Holtz, Holtz, Goodman & Chick, PC

(57) ABSTRACT

A recording medium detection unit is provided on the upper stream side of a carrier mechanism in a carrier route and detects at least the front and back ends in a carrier direction of a recording medium. A nozzle array control unit controls the drive of a plurality of nozzles on the basis of job information reported by a higher-order device and the detection information of the front and back ends by the recording medium detection unit and enables the plurality of nozzles to perform a recording process for inject ink only an area in the range between the front and back ends of the recording medium. A control unit receives image data and also notifies the higher-order device of the stoppage of image data transfer according to the detection of the back end of the recording medium by the recording medium detection unit.

15 Claims, 10 Drawing Sheets

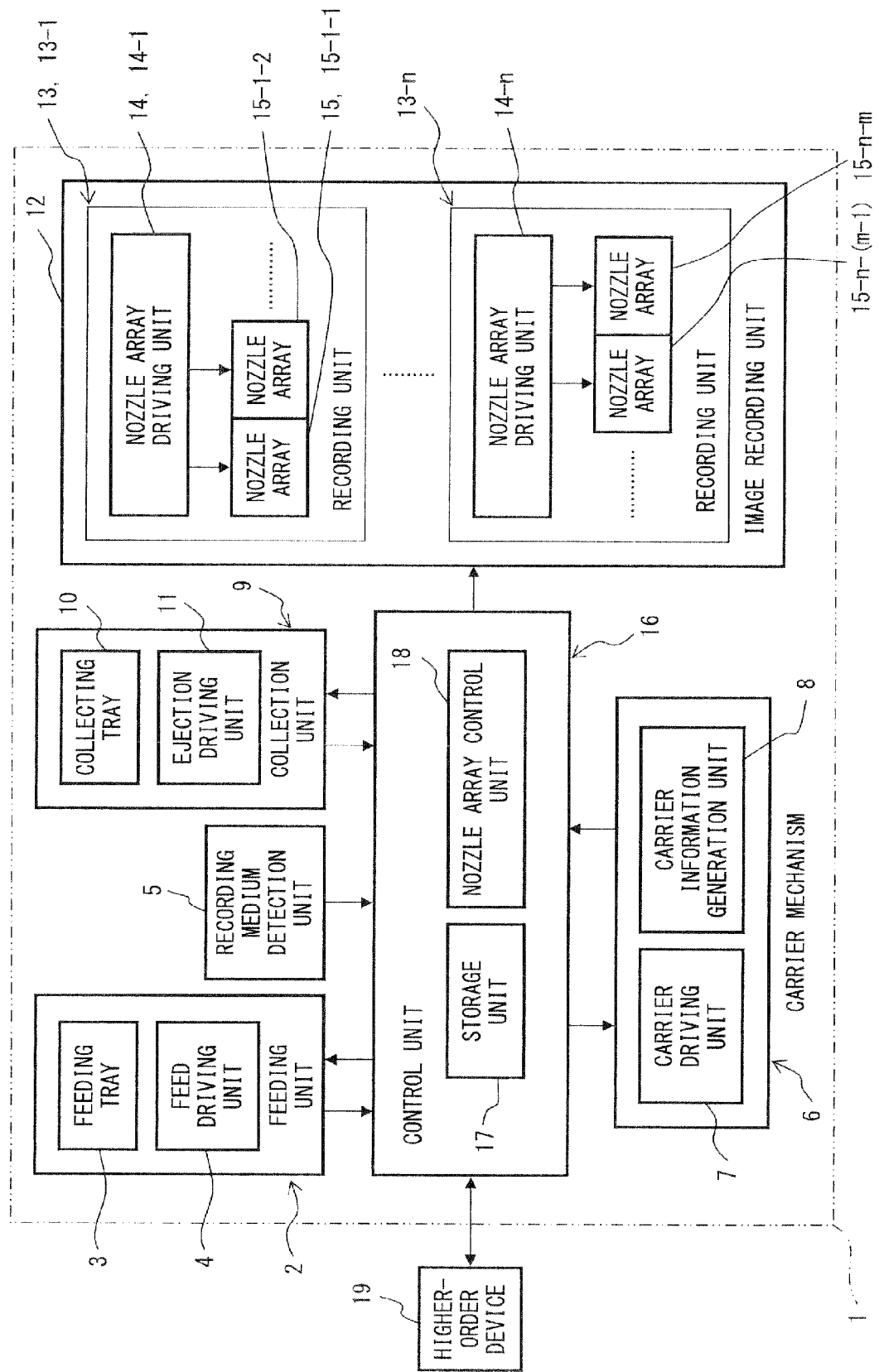
F I G. 1

IMAGE RECORDING APPARATUS, ITS CONTROL METHOD AND STORAGE MEDIUM RECORDING ITS CONTROL PROGRAM

CROSS REFERENCE TO RELATED APPLICATIONS

This application claims the benefit of Japanese Patent Application No. 2008-185416, filed Jul. 16, 2008, the entire contents of which are incorporated herein by this reference.

BACKGROUND OF THE INVENTION

1. Field of the Invention

The present invention relates to an image recording technology and more particularly to a technology for recording images up to near the edge of a recording medium in an image recording apparatus for injecting ink to the recording medium and recording the images.

2. Description of the Related Art

Conventionally, as an image recording apparatus for applying a recording process to a recording medium (record data), such as paper and the like, for example, an ink-jet type full-line image recording apparatus is known. In this image recording apparatus, a nozzle array (recording head) composed of a plurality of nozzles for injecting ink liquid drops, formed across the length equal to or more than the width of the recording medium in a direction (main scanning direction) orthogonal to a carrier direction (sub scanning direction) where the recording medium is carried is arranged for each ink color. These nozzle arrays for each ink color are separated at predetermined intervals in the sub scanning direction and also are arranged in such a way that nozzles are opposed to the recording medium.

In such an image recording apparatus the recording process can be applied across the entire recording medium only by relatively moving the recording medium and a line head having a nozzle array in a direction almost orthogonal to the array direction of the nozzles. Therefore, in such an image recording apparatus, a recording process can be rapidly performed by a simple operation without carriage movement, the intermittent transport of a recording medium. However, when compared with a short recording head, the line head is expensive, has low yield, has low reliability and so on.

As an image recording apparatus for solving such problems, there is one provided with a line head in which an injection nozzle is formed by arranging a plurality of short nozzle arrays arranged in one direction in a nozzle arranging direction. Such a line head has the advantages of a line head while having the advantages of a short nozzle array, such as low cost, high yield, high reliability and the like.

An image recording apparatus provided with a function to record an image across the entire recording medium without forming a blank at the edge of a recording medium, a so-called blankless recording function (also called edgeless recording function) is also proposed.

For example, Japanese Laid-open Patent Application Publication No. 2001-96874 discloses an image recording apparatus. In this image recording apparatus, when an image-forming substance, such as ink or the like is moved to a recording medium on the basis of an image signal and an image is recorded on the recording medium, the image-forming substance is moved to only the existence area of the recording medium on the basis of the existence area information of the recording medium. According to this document, it is said that print in which an image is fully recorded up to the edge (end) (edgeless print) can be realized without wasting a recording medium, ink and the like and also without a stain in the outside area of a recording medium, due to an image-forming substance.

SUMMARY OF THE INVENTION

An image recording apparatus in one aspect of the present invention includes a carrier mechanism for generating carrier information of a recording medium when carrying the recording medium transferred from an upper stream side of a carrier route when carrying the recording medium and at least one recording unit composed of at east one nozzle array formed of a plurality of nozzles in a direction orthogonal to a carrier direction of the recording medium. The image recording apparatus records an image by driving the plurality of nozzles on the basis of image data every time the image recording apparatus receives one line of image data transferred from a higher-order device and injecting ink by a nozzle array driving unit possessed by the recording unit. The image recording apparatus includes a recording medium detection unit provided on an upper stream side of the carrier mechanism in the carrier route, for detecting at least a front end and a back end in the carrier direction of the recording medium, a nozzle array control unit for controlling the drive of the plurality of nozzles on the basis of job information notified by the higher-order device and on the basis of detection information of the front and back ends, detected by the recording medium detection unit and injecting the ink to only an area in a range between the front end and the back end of the recording medium and a control unit for receiving the image data and also notifying the higher-order device of the transfer stoppage of the image data according to the detection of the back end of the recording medium by the recording medium detection unit.

Furthermore, a control method in another aspect of the present invention is the control method for an image recording apparatus including a carrier mechanism for generating the carrier information of a recording medium transferred from an upper stream side of a carrier route when carrying the recording medium and at least one recording unit composed of at least one nozzle array formed of a plurality of nozzles in a direction orthogonal to a carrier direction of the recording medium. Thus, the image recording apparatus records an image by driving the plurality of nozzles on the basis of image data every time the image recording apparatus receives one line of the image data transferred from a higher-order device and injecting ink by a nozzle array driving unit possessed by the recording unit. The control method includes detecting at least the front end and back end in the carrier direction of the recording medium on an upper stream side of the carrier mechanism in the carrier route, receiving the image data, controlling the drive of the plurality of nozzles on the basis of job information notified by the higher-order device, and on the basis of detection information of the front end and the back end and the received image data and enabling the image recording apparatus to inject the ink to only an area in a range between the front end and the back end of the recording medium and notifying the higher-order device of the transfer stoppage of the image data according to the detection of the back end of the recording medium.

A storage medium in another aspect of the present invention stores a program for enabling a computing processor module to control an image recording apparatus including a carrier mechanism for generating carrier information of a recording medium transferred from the upper stream side of a carrier route when carrying the recording medium and at least one recording unit composed of at least one nozzle array formed of a plurality of nozzles in a direction orthogonal to a carrier direction of the recording medium. Thus, the image recording apparatus records an image by driving the plurality of nozzles on the basis of image data every time the image recording apparatus receives one line of image data transferred from a higher-order device and injecting ink by a nozzle array driving unit possessed by the recording unit. The program enables the computing processor module to perform the processes of detecting at least a front end and a back end in the carrier direction of the recording medium on an upper stream side of the carrier mechanism in the carrier route, receiving the image data, controlling drive of the plurality of nozzles on the basis of job information notified by the higher-order device and on the basis of the detection information of the front end and the back end and enabling the image recording apparatus to inject the ink to only an area in a range between the front and the back end of the recording medium and notifying the higher-order device of the transfer stoppage of the image data, according to the detection of the back end of the recording medium.

BRIEF DESCRIPTION OF THE DRAWINGS

The present invention will be more apparent from the following detailed description when the accompanying drawings are referenced.

FIG. 1 is a conceptual block diagram illustrating the configuration of an image recording apparatus according to the preferred embodiment of the present invention.

DESCRIPTION OF THE PREFERRED EMBODIMENTS

The preferred embodiments of the present invention will be explained in detail below with reference to the drawings.

In the following explanation, the carrier direction of a recording medium is assumed to be called a Y direction or sub scanning direction, a direction orthogonal to this carrier direction is assumed to be called an X direction or main direction, and a direction orthogonal to both the X direction and the Y direction is assumed to be called a Z direction.

Firstly, the configuration of an image recording apparatus according to the preferred embodiment of the present invention will be explained.

Figure 2:
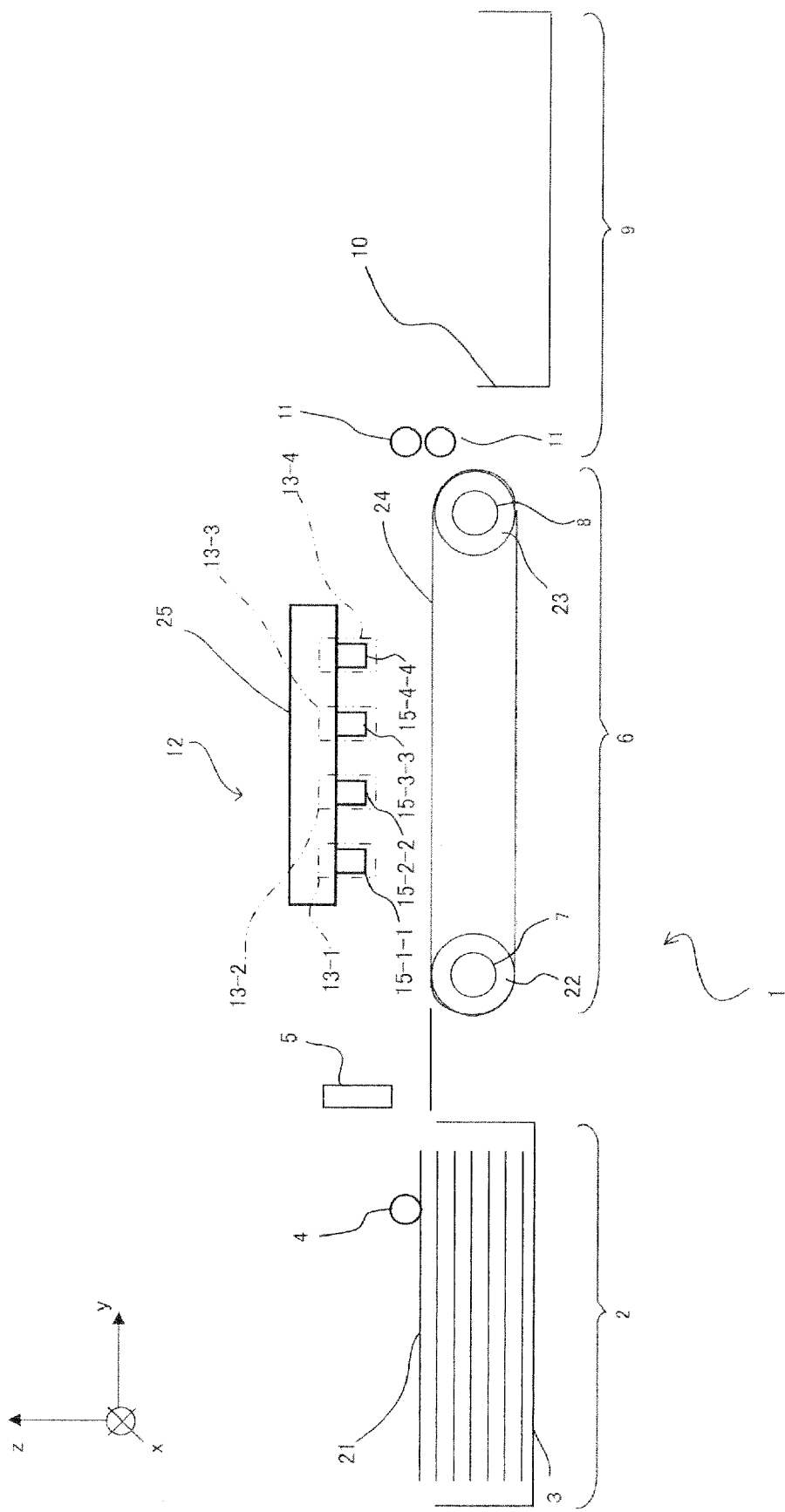
FIG. 2 is a diagram illustrating the arrangement of each component of the image recording apparatus according to the preferred embodiment of the present invention.

FIG. 1 illustrates the configuration of an image recording apparatus according to the preferred embodiment of the present invention by conceptual blocks FIG. 2 illustrates the arrangement of each component of the image recording apparatus according to the preferred embodiment of the present invention.

An image recording apparatus 1 according to the preferred embodiment includes a feeding unit 2, a recording medium detection unit 5, a carrier mechanism 6, a collection unit 9, an image recording unit 12 and a control unit 16. The feeding unit 2 feeds and carries a recording medium 21. The recording medium detection unit 5 is provided in the far upper stream than the carrier mechanism 6 in the carrier route of the recording medium 21 and detects, for example, the front end of the recording medium 21. The carrier mechanism 6 carries the recording medium 21 transferred from the feeding unit 2. The collection unit 9 ejects and collects the recording medium 21 on which an image is recorded. The image recording unit 12 records an image while the recording medium 21 is being carried on the carrier route. The control unit 16 controls the entire image recording apparatus 1.

Next, each component of the image recording apparatus 1 will be further explained.

The feeding unit 2 includes a feeding tray 3 and a feeding drive unit 4. The feeding tray 3 accommodates the recording medium 21 and is composed of a so-called feeding cassette and the like. The feeding drive unit 4 strikes against the recording medium 21 accommodated at the top of the feeding tray 3, extracts one piece after one piece and transfers to the carrier mechanism 6 side. The feeding drive unit 4 is composed of, for example, a feeding roller. The feeding unit 2 transfers the recording medium 21 accommodated in the feeding tray 3 to the carrier mechanism 6.

The recording medium detection unit 5 detects, for example, the head and back ends in a sub scanning direction, of the recording medium 21 and is provided with/composed of, any of, for example, an optical type transparent sensor, an optical type reflective sensor, a capacitance type sensor and the like. When detecting the head and back ends, the recording medium detection unit 5 notifies the control unit 16 of detection information indicating that they are detected. The recording medium detection unit 5 can be also provided with/composed of a line sensor, such a CIS (contact image sensor) or the like. In this case, the recording medium detection unit 5 can detect the head end, back end and positions of each side edge, and notifies the control unit 6 of detection information indicating that that they are detected.

The carrier mechanism 6 includes a driving roller 22 and a driven roller 23 which are separated in the sub scanning direction, a carrier driving unit 7, a carrier information generation unit 8, an endless carrier belt 24 and at least one or more absorptive fans, which are not illustrated in FIG. 2. As illustrated in FIG. 2, the carrier belt 24 is installed in such a way as to be able to be rotated while the carried surface of the recording medium 21 is opposed to the ink ejection hole of at least one or more recording units 13-1 through 13-$n$ ($n$=2 or more integers), mounts the recording medium 21 and carries it at certain speed. The driving roller 22 is driven by the carrier driving unit 7 connected to the rotary shaft of the driving roller 22 and rotates the carrier belt 24. The driven roller 23 is rotated by the carrier belt 24. The carrier information generation unit 8 is connected to the rotary shaft of the driver-roller 23, is provided with/composed of, for example, a rotary encoder. The carrier information generation unit 8 generates a pulse signal as the carrier information of the recording medium 21 every time the carrier belt 24 rotates by a predetermined amount and outputs it to the control unit 16. Therefore, this pulse signal indicates the carried distance of the recording medium 21. The absorptive fan, which is not illustrated in FIG. 2, generates negative pressure under the control of the control unit 16 and absorbs the recording medium 21 on the carrier belt 24.

The collection unit 9 includes, for example, a collection tray 10 and an ejection driving unit 11. The collection tray 10 collects ejected recording medium 21. The ejection driving unit 11 ejects the recording medium 21 carried by the carrier mechanism 6 and is composed of, for example, a pair of ejection rollers.

The image recording unit 12 includes at least one or more recording units 13-1 through 13-$n$. The recording units 13-1 through 13-$n$ include nozzle arrays 15-1-1 through 15-$n$-$m$ (n & m=2 or more integers) and nozzle array driving units 14-1 through 14-$n$ and are supported by a support member 25.

A plurality of nozzles for injecting ink is linearly formed on each of the nozzle arrays 15-1-1 through 15-$n$-$m$. The nozzle arrays 15-1-1 through 15-$n$-$m$ are arranged across the length exceeding the maximum width of the recording medium 21, base on the design of the image recording apparatus 1 in the main scanning direction. Each of the nozzle arrays 15-1-1 through 15-$n$-$m$ injects ink drops from the plurality of nozzles according to the driving signals of the nozzle array driving units 14-1 through 14-$n$ and applies a recording process to the recording medium 21.

The nozzle array driving units 14-1 through 14-$n$ outputs driving signals for driving respective nozzles to the nozzle arrays 15-1-1 through 15-$n$-$m$, respectively, according to the a control signal transmitted from the control unit 16 on the basis of record data information.

The image recording unit 12 will be further explained below.

The recording units 13-1 through 13-$n$ are constituted by arranging the plurality of nozzle arrays 15-1-1 through 15-$n$-$m$, for example, as illustrated in FIG. 2. In FIG. 2, for example, recording units 13-1 through 13-4 for the respective colors of K (black), C (cyan), M (magenta) and Y (yellow) are arranged in order to correspond to four colors. In this case, n indicates the total number of ink colors and in FIG. 2, n=4. And, m indicates the total number of nozzle arrays provided regardless of the total number of ink colors and in FIG. 2, since one nozzle array is arranged for each color, m=4.

The recording units 13-1 through 13-4 for the respective colors are separately arranged along the sub scanning direction and apply a recording process to the recording medium 21 by driving the respective nozzle arrays 15-1-1 through 15-4-4 with timing corresponding to their positions arranged before/after the carrier route. The movement distance of the recording medium 21 up to the respective nozzle arrays 15-1-1 through 15-4-4 after being detected by the recording medium detection unit 5 is converted to carrier information by the carrier information generation unit 8. This carrier information is the number of pulse signals according to the carried distance of the recording medium 21, generated by, for example, a rotary encoder in the carrier information generation unit 8.

The nozzle array driving units 14-1 through 14-$n$ select respective nozzles on the basis of record information from a higher-order device 19 and drive the selected nozzles with timing determined by an ink injection timing control signal which is generated by the nozzle array control unit 18 of the control unit 16 and enable the selected nozzles to inject ink.

The control unit 16 controls each of the feeding unit 2, the carrier mechanism 6, the collection unit 9 and the image recording unit 12 and enables them to apply a recording process (image record) to the recording medium 21.

The control unit 16 includes at least a processing circuit including, for example, a microprocessor unit (MPU) in the computing processor module having a control function and a computing function, which is not illustrated in FIGS. 1 and 2, a storage unit 17 and the nozzle array control unit 18. The storage unit 17 stores a control program and also temporarily stores setting values and the like for the control of the device and image record information. The nozzle array control unit 18 controls the nozzle arrays 15-1-1 through 15-$n$-$m$ on the basis of the setting values read from the storage unit 17. The control unit 16 controls each component of the image recording apparatus 1 by MPU reading the control program from the storage unit 17 and executing it. The control unit 16 also provides for a function as the nozzle array control unit 18 for controlling the ink injection timing of the nozzle arrays 15-1-1 through 15-$n$-$m$.

The storage unit 17 includes read only memory (ROM) being a storage medium for storing the control program, random access memory (RAM) becoming the work memory of the MPU and a non-volatile memory for storing the specification information of a recording process, including record data.

The nozzle array control unit 18 will be explained in detail later.

The higher-order device 19 is, for example, a computer operated by a user, for enabling the image recording apparatus 1 according to this preferred embodiment to perform a recording process. This higher-order device 19 is connected to the image recording apparatus 1 according to this preferred embodiment as an external device via, for example, a local area network (LAN) or the like. The higher-order device 19 notifies the image recording apparatus 1 according to this preferred embodiment of job information as the information of the recording process. The job information Includes image record information used when a recording process is applied to the recording medium 21. This image record information includes recorded image size information, resolution, density, color information, the address information of image data stored in the memory of the higher-order device 19 and the like. The higher-order device 19 also perform a pseudo gradation conversion process for converting multi-gradation image data composed of light of three primary colors of R (red), G (green) and B (blue) to a gradation value that the image recording apparatus can output, composed of a color of K, C, M and Y, and the like. This image data to which pseudo gradation conversion is applied is stored in the memory of the higher-order device 19. When receiving an image data request as well as specified line information (stored memory address) from the image recording apparatus 1, the higher-order device 19 transfers this stored image data to the image recording apparatus 1 for each line.

When receiving job information from the higher-order device 19, the control unit 16 of the image stores it in the storage unit 17.

When receiving an instruction to start a record process from the higher-order device 19, the control unit 16 controls the carrier driving unit 7 of the carrier mechanism 6 to start rotating the carrier belt 24. Then, the control unit 16 controls the feeding drive unit 4 of the feeding unit 2 to pick up and transfer/carry the recording medium 21 mounted on the feeding tray 3 to the carrier mechanism 6 one piece after one piece.

In due time, for example, the front end of the recording medium 21 carried on the carrier route is detected by the recording medium detection unit 5. Then, the recording medium detection unit 5 outputs a front end edge signal indicating that the front end has been detected to the control unit 16. The control unit 16 receives this front end edge signal and uses it as a trigger signal for generating record process timing.

Then, the recording medium 21 that has passed through the recording medium detection unit 5 is further carried to the lower stream side of the carrier route and in due time is absorbed on the carrier belt 24 of the carrier mechanism 6.

The nozzle array control unit 18 converts the image data received from the higher-order device 19 to recordable data, on the basis of job information and a setting value corresponding to the job information, stored in the storage unit 17 and transfers it to the image recording unit 12. This image data conversion process includes data distribution for each nozzle array, data position matching, record density conversion and the like. The nozzle array control unit 18 controls ink injection timing on the basis of job information from the higher-order device 19 and determines a record position in the sub scanning direction when a recording process is applied to the recording medium 21.

The pulse signal of a rotary encoder, being carrier information generated by the carrier information generation unit 8 is also used as a synchronization signal used when the nozzle arrays 15-1-1 through 15-*n*-*m* performs a recording process. In other words, the control unit 16 stores the information of timing for enabling the nozzle arrays 15-1-1 through 15-*n*-*m* to start injecting ink in the storage unit 17 in advance. More specifically, this timing information is, for example, the count value of the number of pulse signals from the recording medium detection unit 5, corresponding to the distances of the nozzle arrays 15-1-1 through 15-4-4, illustrated in FIG. 2. The nozzle array control unit 18 of the control unit 16 detects the matching between this number of pulse signals and the number of the pulse signals of a rotary encoder, generated by the carrier information generation unit 8. The nozzle array control unit 18 controls the nozzle array driving units 14-1 through 14-*n* of the image recording unit 12 with timing this matching is detected to enable the nozzle arrays 15-1-1 through 15-4-4 to inject ink and apply a recording process to the recording medium 21 absorbed on the carrier belt 24.

The recording medium 21 to which a recording process has been applied thus is transferred to the collection unit provided on the lower stream side of the carrier mechanism 6. Then, the recording medium 21 is pinched by an ejection driving unit 11, is carried on the far lower stream side of the carrier route and in due time, is collected into the collection tray 10.

Figure 3:
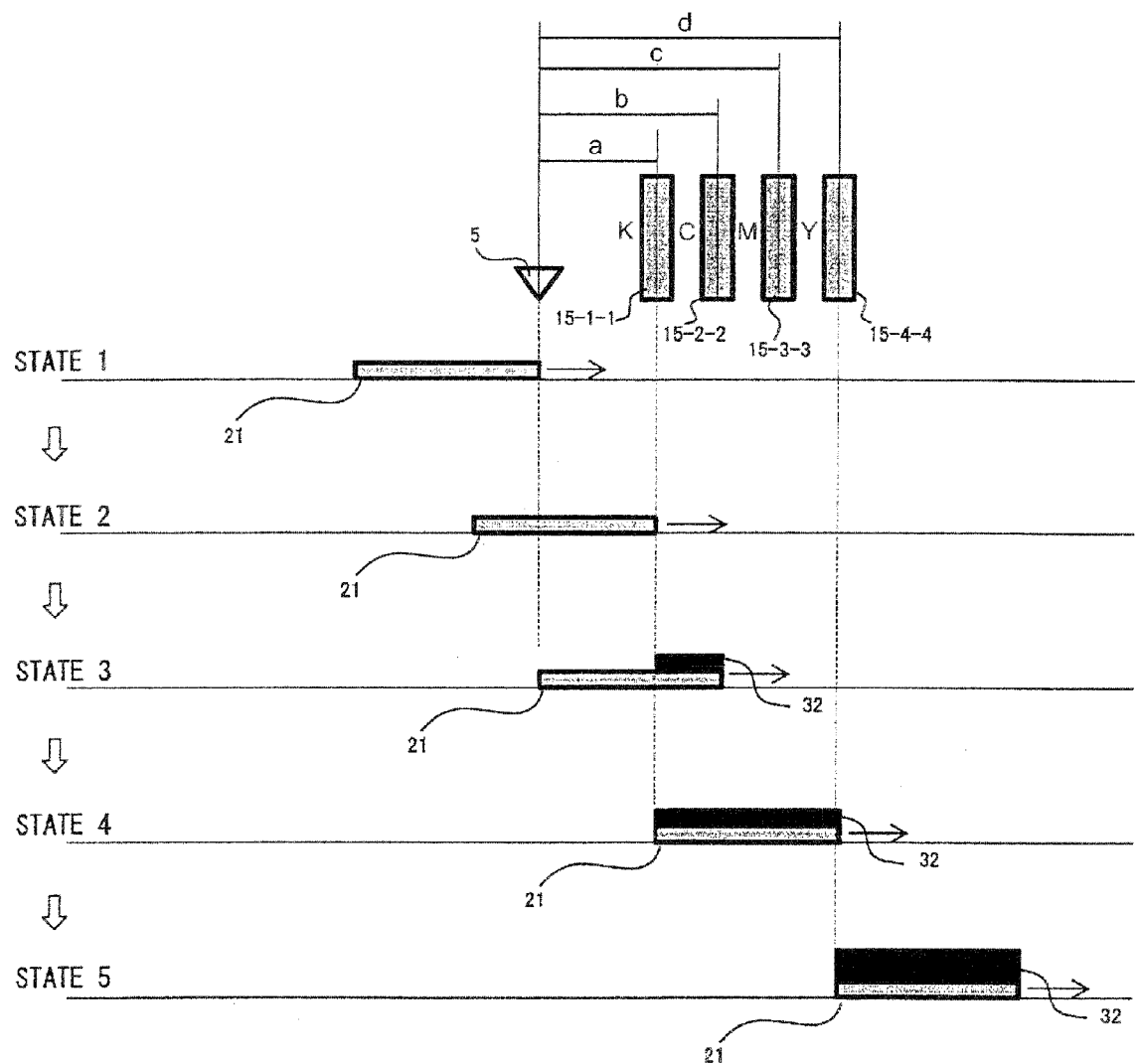
FIG. 3 is a diagram typically illustrating a timing relationship between the detection of a recording medium and image record in the image recording apparatus according to the preferred embodiment of the present invention.

Next, FIG. 3 will be explained. FIG. 3 typically illustrates a timing relationship between the detection of the recording medium 21 and image record in the image recording apparatus 1 according to this preferred embodiment.

In FIG. 3, the image record is applied to the recording medium 21 through a carrying process from a state 1 to a state 5 by the carrier mechanism 6.

In the state 1, after the recording medium 21 being carried from the feeding unit 2, the front end in the carrier direction (called "carrier front end") of the recording medium 21 is carried to the detection area of the recording medium detection unit 5 and is detected.

Then, the recording medium 21 is further carried and in a state 2, with timing the carrier front end of the recording medium 21 reaches a position opposed to the nozzle array 15-1-1 for color K, the image record for color K is started. In this case, the number of pulse signals generated by the carrier information generation unit 8 according to a carried distance between the recording medium detection unit 5 and the nozzle array 15-1-1 is stored in the storage unit 17 in advance. Therefore, the nozzle array control unit 18 detects timing this number of pulse signals and the number of pulse signals generated by the carrier information generation unit 8 after the carrier front end of the recording medium 21 actually passes through the detection area of the recording medium detection unit 5 are matched. Then, the nozzle array control unit 18 enables the nozzle array 15-1-1 to inject ink and apply a recording process to the recording medium 21 with this matched timing.

Then, the recording medium 21 is further carried and in a state 3, the back end in the carrier direction (called "carrier back end") of the recording medium 21 is carried to the detection area of the recording medium detection unit 5 and is detected. In this state, the image record for colors K and C is already started and an image 32 is recorded on the recording medium 21 with the injected ink.

Then, the recording medium 21 is further carried and in a state 4, with timing the carrier back end of the recording medium 21 reaches a position opposed to the nozzle array 15-1-1 for color K, the image record for color K is stopped. As described above, the number of pulse signals generated by the carrier information generation unit 8 according to a carried distance between the recording medium detection unit 5 is stored in the storage unit 17 in advance. Therefore, the nozzle array control unit 18 detects timing this number of pulse signals and the number of pulse signals generated by the carrier information generation unit 8 after the carrier front end of the recording medium 21 actually passes through the detection area of the recording medium detection unit 5 are matched. Then, the nozzle array control unit 18 enables the nozzle array 15-1-1 to stop injecting ink and stop applying a recording process to the recording medium 21 with this matched timing. In this state 4, the image record for colors C, M and Y are is continued and an image 32 continues to be recorded on the recording medium 21 with the injected ink.

Although in the above explanation an image 32 is recorded with the ink for color K by the nozzle array 15-1-1, similarly an image 32 is recorded with the ink for colors C, M and Y by the nozzle arrays 15-2-2, 15-3-3 and 15-4-4, respectively.

Then, the recording medium 21 is further carried and in the state 5, the carrier back end of the recording medium 21 reaches the nozzle array 15-4-4 for color Y. Then, the nozzle array control unit 18 detects timing this number of pulse signals and the number of pulse signals generated by the carrier information generation unit 8 after the carrier front end of the recording medium 21 actually passes through the detection area of the recording medium detection unit 5 are matched. Then, the nozzle array control unit 18 enables the nozzle array 15-4-4 to stop injecting ink and stop applying a recording process to the recording medium 21 with this matched timing. In this state 5, the image record for colors C, M and Y are is already completed and the record of the image 32 on the recording medium 21 is stopped.

Figure 4:
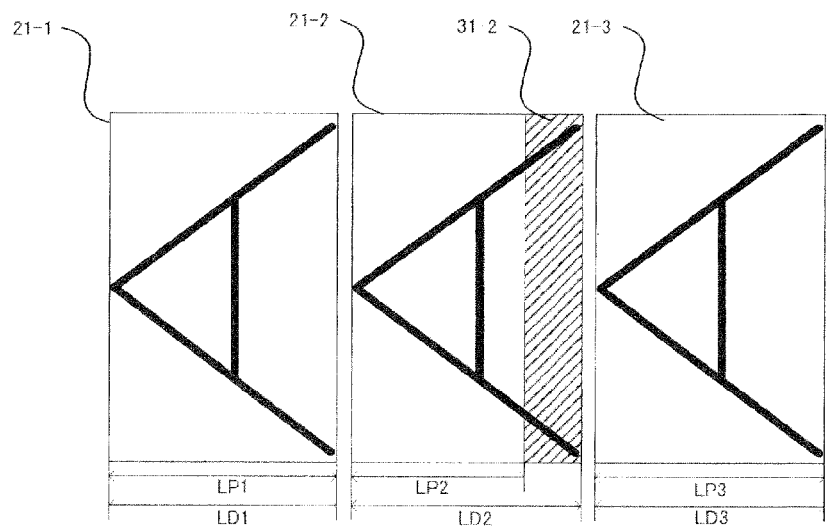
FIG. 4 is a diagram typically illustrating the first example of a relationship between a recording medium and image data to be recorded in the image recording apparatus according to the preferred embodiment of the present invention.
Figure 4:
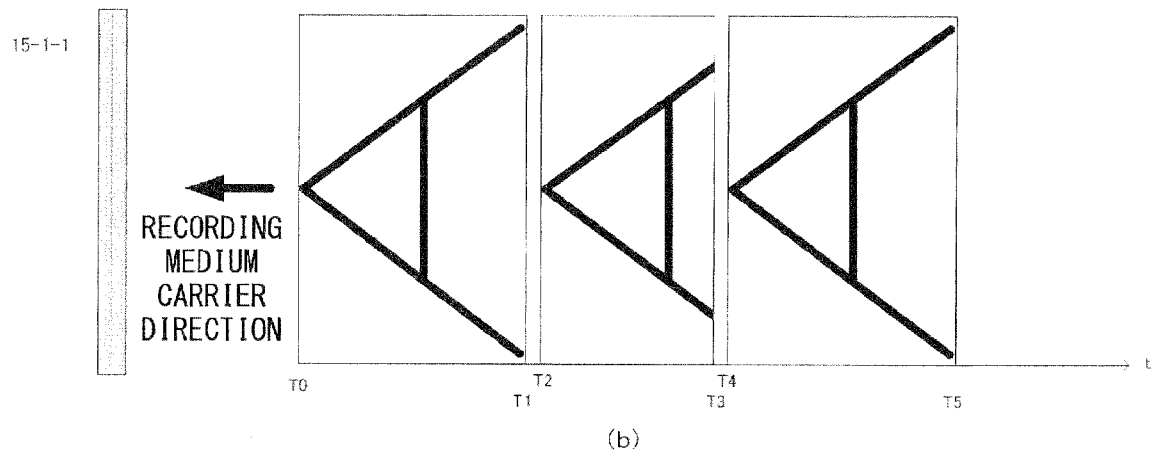

Next, FIG. 4 will be explained. FIG. 4 typically illustrates the first example of a relationship between the recording medium 21 and image data to be recorded in the image recording apparatus 1 according to this preferred embodiment. In this first example, one nozzle array 15-1-1 for a single color is arranged in the recording unit 13-1.

FIG. 4 illustrates a state where three pieces of recording media 21-1, 21-2 and 21-3 are consecutively carried. In this example, LP1, LP2 and LP3 indicate the lengths of the recording media 21-1, 21-2 and 21-3 in the Y direction, detected by the recording medium detection unit 5, respectively. LD1, LD2 and LD3 indicate image data lengths in the Y direction of record image size information included in respective pieces of job information that are transmitted from the higher-order device 19 and stored in the storage unit 17.

As clear from (a) of FIG. 4, as to the recoding media 21-1 and 21-3, LP1=LD1 and LP3=LD3 hold true. Therefore, the control unit 16 receives image data according to these Y-direction image data lengths LD1 and LD3 and the nozzle array control unit 18 records an image on the recording media 21-1 and 21-3, across the lengths LP1 and LP3, respectively.

However, in the recording medium 21-2, the Y-direction recording medium length LP2 detected by the recording medium detection unit 5 is smaller than the Y-direction image data length and LP2<LD2. When in this state, an image is recorded across the length LD2, the array 15-1-1 injects ink corresponding to image data up to a slashed portion 31-2 not opposed to the recording medium 21-2 outside the carrier belt 24. Therefore, the control unit 16 calculates the record range of the image data on the basis of the Y-direction recording medium length LP2 detected by the recording medium detection unit 5 and the Y-direction image data LD2 included in job information and stops recording an image on the slashed portion 31-2. This stoppage timing is determined on the basis of the number of pulse signals corresponding to the carried distance of the recording medium 21, generated by the carrier information generation unit 8 based on the carrier back end detection information of the recording medium 21-2 detected by the recording medium detection unit 5, and is determined on the basis of nozzle array arrangement information stored in the storage unit 17 in advance.

Furthermore, the control unit 16 stops receiving the image data corresponding to the slashed portion 31-2 from the higher-order device 19 and converting the image data to recordable data.

(b) of FIG. 4 typically illustrates an image recorded thus and its recording timing, from which it is found that nothing is recorded on the slashed portion of 31-2. Waste is avoided by preventing the control unit 16 from receiving image data in the slashed portion 31-2, which is not recoded, from the higher-order device 19.

In this case, respective timing with which the feeder unit 2 feeds the recording media 21-1, 21-2 and 21-3 to the carrier mechanism 6 is not constant. In other words, the control unit 16 controls timing with which the feeder unit feeds the recording media to the carrier mechanism 6 in such a way that intervals between the carrier back end of a preceding recording medium and the carrier front end of a subsequent recording medium become equal, regardless of the difference of the Y-direction recording medium length.

Thus, the control unit 16 records image up to the respective edges of the recording media 21-1, 21-2 and 21-3. The control unit 16 also controls in such a way that a carrier time interval T2−T1 between the carrier back end of the recording medium 21-1 and the carrier front end of the recording medium 21-2 is equal to a carrier time interval T4−T3 between the carrier back end of the recording medium 21-2 and the carrier front end of the recording medium 21-3 and it is the minimum carrier time interval. Thus, the receiving process of useless image data from the higher-order device 19 and the conversion process from image data to recordable data are omitted and also it is not controlled in such a way that T4−T3 becomes longer than T2−T1. Therefore, the throughput of image record can be improved.

The recording medium width detection unit of the recording medium detection unit 5 detects the width of each of the recording media 21-1, 21-2 and 21-3, which is not illustrated in FIG. 4. The control unit 16 calculates a record range in the width direction (X-direction) of image data transmitted from the higher-order device 19 and applies a process for stopping image record to image data not determined to be opposed to the recording medium 21, on the basis of this calculation result and the detection result of the recording medium width detection unit. In this case, as to image data corresponding to the slashed portion 31-2, not determined to be opposed to the recording medium 21, the control unit 16 also stops receiving it from the higher-order device 19 and conversion it to recordable data.

Next, the operational timing of each component of the image recording apparatus 1 according to this preferred embodiment will be explained with reference to FIG. 5. The first example of the timing chart illustrated in FIG. 5 indicates a case where four recording units 13-1 through 13-4 corresponding to four ink colors of K, C, M and Y, respectively, are provided, as illustrated in FIG. 2. In this first example, four mono-color nozzle arrays 15-1-1, 15-2-2, 15-3-3 and 15-4-4 are also provided for the recording units 13-1 through 13-4, respectively, as illustrated in FIG. 4. Furthermore, in this first example, the length in the Y-direction of the recording medium 21-2 is remarkable shorter than those of the recording media 21-1 and 21-3 in FIG. 4, specifically, in a state where three pieces of recording media 21-1, 21-2 and 21-3 are consecutively carried.

Figure 5:
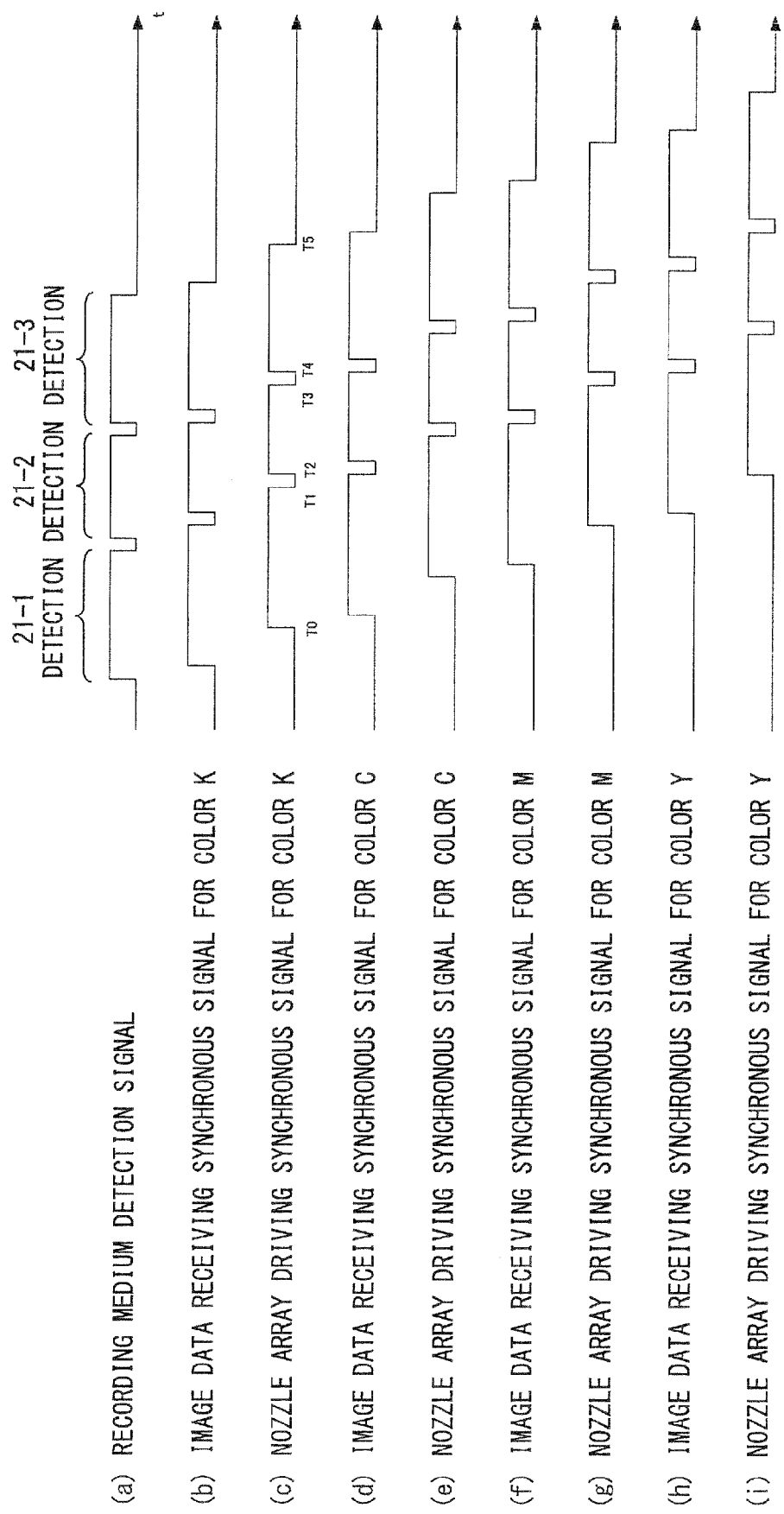
FIG. 5 is a diagram illustrating the first example of the operational timing of each component of the image recording apparatus according to the preferred embodiment of the present invention.

In FIG. 5, a chart (a) indicates the detection signal of the recording media 21 (21-1, 21-2 and 21-3) transmitted from the recording medium detection unit 5 to the control unit 16. This detection signal is a binary logical signal. When it is at an H level (high level), it indicates that the recording medium 21 is detected and when it is at an L level (low level), it indicates that the recording medium 21 is not detected. Therefore, the rising-up and falling-down edges of this detection signal indicate the detection of the carrier front and back ends, respectively, of the recording medium 21.

In FIG. 5, a chart (b) indicates the receiving synchronous signal of image data for color K transmitted from the higher-order device 19. The control unit 16 generates this synchronous signal on the basis of the above-described detection signal and receives the image data for color K according to this synchronous signal. Specifically, the control unit 16 starts receiving the image data for color K when the detection signal transmitted from the recording medium detection unit 5 indicates the detection of the carrier front end of the recording medium 21 and stop receiving it when the detection signal transmitted from the recording medium detection unit 5 indicates the detection of the carrier back end of the recording medium 21.

In FIG. 5, a chart (c) indicates the driving synchronous signal of the nozzle array 15-1-1 for color K. The nozzle array control unit 18 of the control unit 16 generates this driving synchronous signal on the basis of the above-described receiving synchronous signal of the image data for color K and controls the driving of the nozzle array 15-1-1 according to this driving synchronous signal. Specifically, the nozzle array control unit 18 starts the driving control process of the nozzle array 15-1-1 for color K when the detection signal transmitted from the recording medium detection unit 5 indicates the detection of the carrier front end of the recording medium 21 and the control 16 starts receiving the image data for color K. Then, when the detection signal indicates the detection of the carrier back end of the recording medium 21 and the control 16 terminates the reception of the image data for color K, the nozzle array control unit 18 terminates the driving control process of the nozzle array 15-1-1 for color K. Times T0, T1, T2, T3, T4 and T5 indicated in this timing chart (c) is attached in relation to those attached to (b) of FIG. 4.

In FIG. 5, charts (d), (f) and (h) indicate the receiving synchronous signals for colors C, M and Y, respectively, transmitted from the higher-order device 19. Charts (e), (g) and (i) indicate the driving synchronous signals of the nozzle array 15-2-2 for color C, the nozzle array 15-3-3 for color M and the nozzle array 15-4-4 for color Y, respectively. The nozzle arrays 15-1-1, 15-2-2, 15-3-3 and 15-4-4 are arranged from the upper stream toward the lower stream in the carrier direction of the carrier route of the recording medium 21 in this order. Therefore, the receiving processes of image data for colors C, M and Y and the driving control processes of the nozzle arrays 15-2-2, 15-3-3 and 15-4-4 are delayed from the receiving process of the image data for color K and the driving control process of the nozzle arrays 15-1-1, respectively, according to these arranged positions and are performed. By performing the image data receiving processes and the driving control processes with this timing, the reception of useless image data and conversion to recordable data are avoided. Thus, image can be recorded up to the edge of the recording medium 21 for each color of KCMY and the throughput of image record can be improved.

Figure 6:
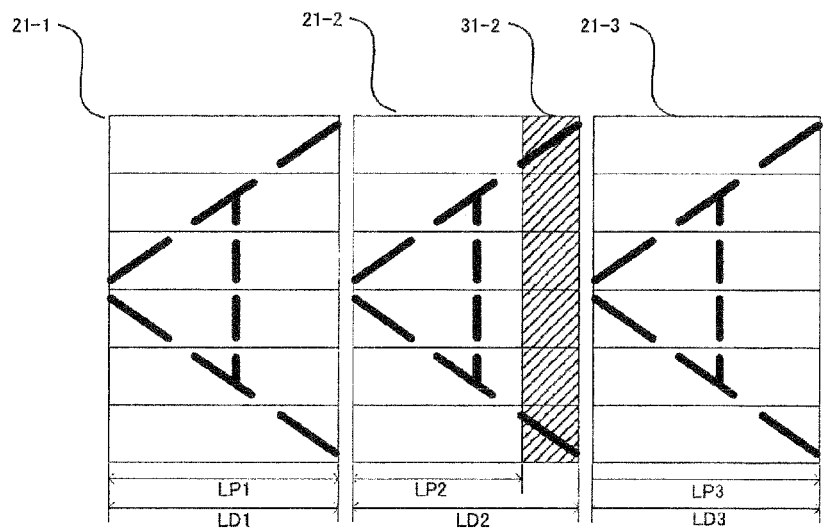
FIG. 6 is a diagram typically illustrating the second example of a relationship between a recording medium and image data to be recorded in the image recording apparatus according to the preferred embodiment of the present invention.
Figure 6:
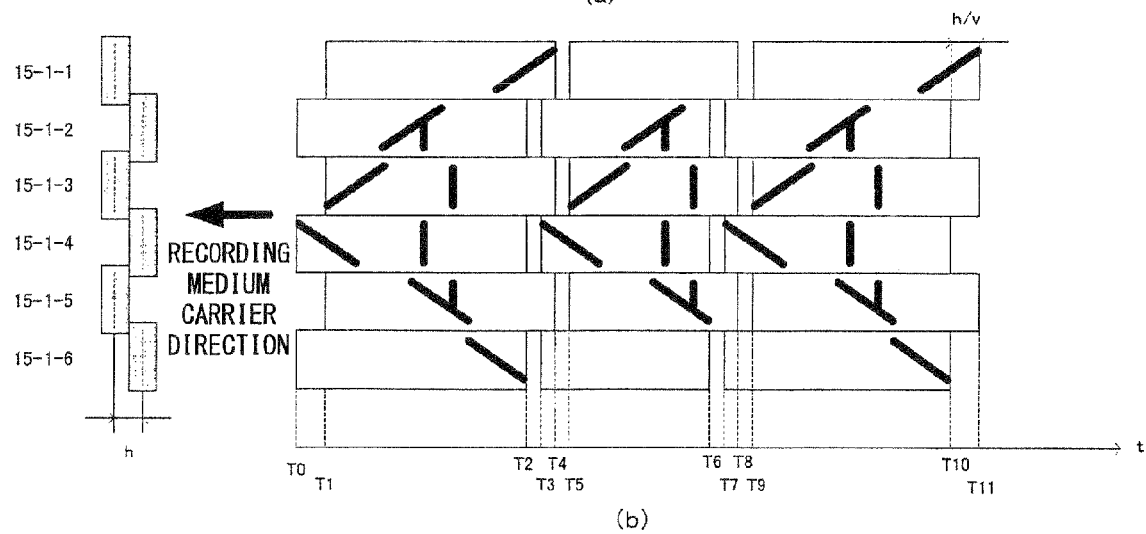

Next, FIG. 6 will be explained. FIG. 6 typically illustrates the second example of a relationship between the recording medium 21 and image data to be recorded in the image recording apparatus 1 according to this preferred embodiment. In the second example, six mono-color nozzle arrays 15-1-1 through 15-1-6 are provided back and forth alternatively in the carrier direction of the recording medium 21 for the recording unit 13-1.

FIG. 6 indicates a state where three pieces of recording media 21-1, 21-2 and 21-3 are consecutively carried. In this example, LP1, LP2 and LP3 indicate the lengths of the recording media 21-1, 21-2 and 21-3, respectively in the Y direction, detected by the recording medium detection unit 5. LD1, LD2 and LD3 indicate Y-direction image data lengths of the record image size information included in respective pieces of job information that are transmitted from the higher-order device 19 and stored in the storage unit 17.

In (a) of FIG. 6, the relationships between LP1, Lp2 and LP3 and LD1, LD2 and LD3, respectively, are the same as those in (a) of FIG. 4. In other words, in (a) of FIG. 6 too, while LP1=LD1 and LP3=LD3 hold true, LP2<LD2. In this case, the control unit 16 performs the same process as in (a) of FIG. 4. Specifically, the control unit 16 calculates the record range of image data on the basis of the Y-direction recording medium length LP2 detected by the recording medium detection unit 5 and the Y-direction image data LD2 included in job information, and stops recording an image on the slashed portion 31-2. Furthermore, as to image data corresponding to the slashed portion 31-2, the control unit 16 stops receiving it from the higher-order device 19 and converting the image data to recordable data.

(b) of FIG. 6 typically illustrates image record performed thus and its recording timing, from which it is found that the slashed portion 31-2 is not recorded.

In FIG. 6, as illustrated in FIG. 6, six nozzle arrays 15-1-1 through 15-1-6 for injecting the same color ink are arranged back and forth alternatively at intervals of a distance h. Therefore, it is necessary to differentiate the respective execution timing of the driving control processes of the nozzle arrays 15-1-1 through 15-1-6, according their respective arrangement. For example, it is assumed that the nozzle arrays 15-1-2, 15-1-4 and 15-1-6 arranged on the upper stream side in the carrier direction of the recording medium 21 start image record at a time T0. In this case, the nozzle arrays 15-1-1, 15-1-3 and 15-1-5 arranged on the lower stream side in the carrier direction start image record at a time T1 delayed from time T0 by a predetermined time. This record starting timing is determined by a recording medium detection signal transmitted from the recording medium detection unit 5 on the basis of the number of pulse signals corresponding to the carrier distance of the recording medium 21-1, generated by the carrier information generation unit 8 and nozzle array arrangement information stored in the storage unit 17 in advance. Assuming that the carrier speed of the recording medium 21 is v, a time difference T1–T0 in recording starting time in a case where a nozzle array arranged in the carrier direction of the recording medium 21 separated by the distance h starts recording data on the recording medium 21-1 becomes h/v.

In this second example too, respective timing with which the feeder unit 2 feeds the recording media 21-1, 21-2 and 21-3 to the carrier mechanism 6 is not constant. Specifically, the control unit 16 controls timing with which the feeder unit feeds the recording media to the carrier mechanism 6 in such a way that intervals between the carrier back end of a preceding recording medium and the carrier front end of a subsequent recording medium become equal regardless of the difference of the Y-direction recording medium length.

After time T1 elapses, the recording medium 21-1 continues to be carried and in due time, at time T2, the image record by the nozzle arrays 15-1-2, 15-1-4 and 15-1-6 on the upper stream side in the carrier direction of the recording medium 21 is terminated. Then, at time T3, the nozzle arrays 15-1-2, 15-1-4 and 15-1-6 starts image record on the recording medium 21-2. In this case, a time difference between T3 and T2 corresponds to a carrier time interval between the carrier back end of the recording medium 21-1 and the carrier front end of the recording medium 21-2.

Then, at time T4, the image record on the recording medium 21-1 of the nozzle arrays 15-1-1, 15-1-3 and 15-1-5 on the lower stream side in the carrier direction of the recording medium 21 is terminated. Then, at time T5, the nozzle arrays 15-1-1, 15-1-3 and 15-1-5 start image record on the recording medium 21-2. The relationship among these times is as follows.

$$T5-T3=T4-T2=T1-T0=h/v$$

After time T5 elapses, the recording medium 21-2 continues to be carried and in due time, at time T6, the image record by the nozzle arrays 15-1-2, 15-1-4 and 15-1-6 on the upper stream side in the carrier direction of the recording medium 21 stops. This stoppage timing is determined by the detection information of the carrier back end of the recording medium 21-2 transmitted from the recording medium detection unit 5 on the basis of the number of pulse signals corresponding to the carried distance of the recording medium 21-2, generated by the carrier information generation unit 8 and on the basis of nozzle array arrangement information stored in the storage unit 17 in advance. Then, at time T7, the nozzle arrays 15-1-2, 15-1-4 and 15-1-6 start image record on the recording medium 21-3. In this case, a time difference between time T7 and time T6 corresponds to a carrier time interval between the carrier back end of the recording medium 21-2 and the carrier front end of the recording medium 21-3.

Then, at time T8, the image record on the recording medium 21-2 of the nozzle arrays 15-1-1, 15-1-3 and 15-1-5 on the lower stream side in the carrier direction of the recording medium 21 stops. Then, at time T9, the nozzle arrays 15-1-1, 15-1-3 and 15-1-5 starts image record on the recording medium 21-3. The relationship among these times is as follows.

$$T9-T7=T8-T6=T1-T0=h/v$$

After time T9 elapses, the recording medium 21-3 continues to be carried and in due time, at time T10, the image record on the recording medium 21-3 by the nozzle arrays 15-1-2, 15-1-4 and 15-1-6 on the upper stream side in the carrier direction of the recording medium 21 is terminated. Then, at time T11, image record on the recording medium 21-3 by the nozzle arrays 15-1-1, 15-1-3 and 15-1-5 on the lower stream side in the carrier direction of the recording medium 21 is terminated.

The control unit 16 records an image up to the respective edges of the recording media 21-1, 21-2 and 21-3 thus. The control unit 16 also controls in such a way that a carrier time interval T3−T2 between the carrier back end of the recording medium 21-1 and the carrier front end of the recording medium 21-2 is equal to a carrier time interval T7−T6 between the carrier back end of the recording medium 21-2 and the carrier front end of the recording medium 21-3 and it is the minimum carrier time interval. Thus, the receiving process of useless image data from the higher-order device 19 and the conversion process from image data to recordable data are omitted and also it is not controlled in such a way that T7−T6 becomes longer than T3−T2. Therefore, the throughput of image record can be improved.

Next, the operational timing of each component of the image recording apparatus 1 according to this preferred embodiment will be explained with reference to FIG. 7. The second example of the timing chart illustrated in FIG. 7 indicates a case where four recording units 13-1 through 13-4 corresponding to four ink colors of K, C, M and Y, respectively, are provided, as illustrated in FIG. 2. In this second example, as illustrated in FIG. 6, a plurality of nozzle arrays 15-1-1 through 15-4-m, are also provided for each of the recording units for each color 13-1 through 13-4, respectively, back and forth alternatively. Furthermore, in this second example, the length in the Y-direction of the recording medium 21-2 is remarkable shorter than those of the recording media 21-1 and 21-3 in FIG. 6, specifically, in a state where three pieces of recording media 21-1, 21-2 and 21-3 are consecutively carried.

Figure 7:
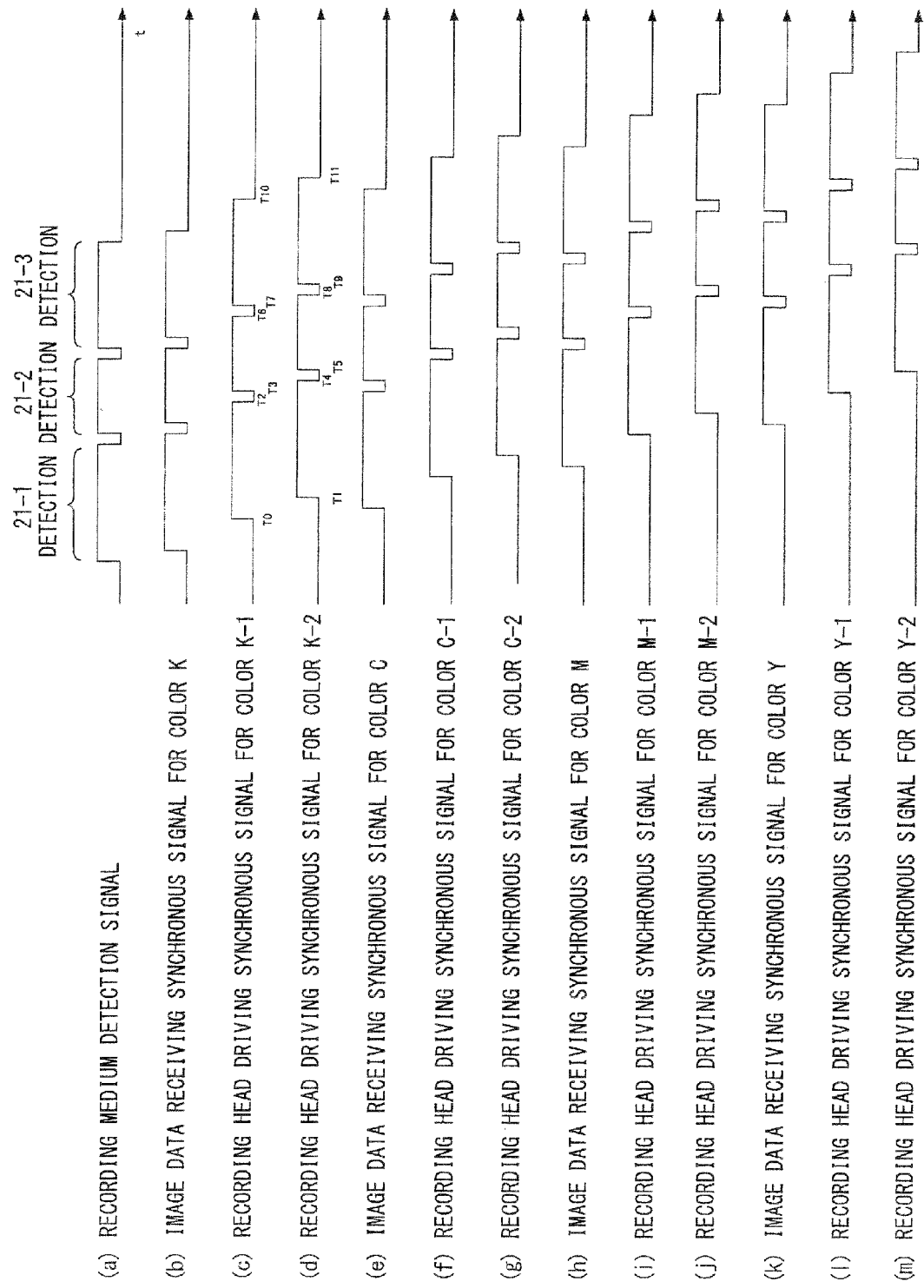
FIG. 7 is a diagram illustrating the second example of the operational timing of each component of the image recording apparatus according to the preferred embodiment of the present invention.

In FIG. 7, a chart (a) indicates the detection signal of the recording media 21 (21-1, 21-2 and 21-3) transmitted from the recording medium detection unit 5 to the control unit 16. As in (a) of FIG. 5, this detection signal is a binary logical signal. When it is at an H level (high level), it indicates that the recording medium 21 is detected and when it is at an L level (low level), it indicates that the recording medium 21 is not detected. Therefore, the rising-up and falling-down edges of this detection signal indicate the detection of the carrier front and back ends, respectively, of the recording medium 21.

In FIG. 7, a chart (b) indicates the receiving synchronous signal of image data for color K transmitted from the higher-order device 19. As in (b) of FIG. 5, the control unit 16 generates this synchronous signal on the basis of the above-described detection signal and receives the image data for color K according to this synchronous signal. Specifically, the control unit 16 starts receiving the image data for color K when the detection signal transmitted from the recording medium detection unit 5 indicates the detection of the carrier front end of the recording medium 21 and stop receiving it when the detection signal transmitted from the recording medium detection unit 5 indicates the detection of the carrier back end of the recording medium 21.

In FIG. 7, a chart (c) indicates the driving synchronous signal (driving synchronous signal for color K-1) of the nozzle arrays 15-1-2, 15-1-4 and 15-1-6 for color K on the upper stream side in the carrier direction of the recording medium 21. A chart (d) indicates the driving synchronous signal (driving synchronous signal for color K-2) of the nozzle arrays 15-1-1 15-1-3 and 15-1-5 for color K on the lower stream side in the carrier direction of the recording medium 21.

The nozzle array control unit 18 of the control unit 16 generates these driving synchronous signals for colors K-1 and K-2 on the basis of the above-described receiving synchronous signal of the image data for color K and controls the driving of the nozzle arrays 15-1-1 through 15-1-6 according to these driving synchronous signals. Specifically, the nozzle array control unit 18 starts the driving control process of the nozzle arrays 15-1-2, 15-1-4 and 15-1-6 for color K when the detection signal transmitted from the recording medium detection unit 5 indicates the detection of the carrier front end of the recording medium 21 and the control 16 starts receiving image data for color K. Then, when the detection signal indicates the detection of the carrier back end of the recording medium 21 and the control 16 terminates the reception of the image data for color K, the nozzle array control unit 18 terminates this driving control process.

The nozzle array control unit 18 also controls the driving of the nozzle arrays for color K 15-1-1, 15-1-3 and 15-1-5. This driving control process is started after the detection signal transmitted from the recording medium detection unit 5 indicates the detection of the carrier front end of the recording medium 21 and the control 16 starts receiving image data for color K and also after the driving control process of the nozzle arrays 15-1-2, 15-1-4 and 15-1-6 is started Then, this driving control process is terminated after the detection signal indicates the detection of the carrier back end of the recording medium 21 and the control 16 terminates the reception of the image data for color K and also the driving control process of the nozzle arrays 15-1-2, 15-1-4 and 15-1-6 is terminated.

Times T0, T1, T2, T3, T4, T5, T6, T7, T8, T9, T10 and T11 indicated in these timing charts (c) and (d) are attached in relation to those attached to (b) of FIG. 6.

In FIG. 7, charts (e), (h) and (k) indicate the receiving synchronous signals for colors C, M and Y, respectively, transmitted from the higher-order device 19.

A chart (f) indicates the driving synchronous signal of the nozzle arrays 15-2-8, 15-2-10 and 15-2-12 for color C on the upper stream side in the carrier direction of the recording medium 21. A chart (i) indicates the driving synchronous signal of the nozzle arrays 15-3-14, 15-3-16 and 15-3-18 for color M on the upper stream side in the carrier direction of the recording medium 21. A chart (l) indicates the driving synchronous signal of the nozzle arrays 15-4-20, 15-4-22 and 15-4-24 for color Y on the upper stream side in the carrier direction of the recording medium 21.

Furthermore, a chart (g) indicates the driving synchronous signal of the nozzle arrays 15-2-7, 15-2-9 and 15-2-11 for color C on the lower stream side in the carrier direction of the recording medium 21. A chart (j) indicates the driving synchronous signal of the nozzle arrays 15-3-13, 15-3-15 and 15-3-17 for color M on the lower stream side in the carrier direction of the recording medium 21. A chart (m) indicates the driving synchronous signal of the nozzle arrays 15-4-19, 15-4-21 and 15-4-23 for color Y on the lower stream side in the carrier direction of the recording medium 21.

Therefore, the image data receiving processes and the driving control processes of the respective nozzle arrays 15-2-7 through 15-4-24, for respective colors of C, M and Y are delayed and performed compared with the image data receiving process and the driving control process of the nozzle arrays 15-1-1 through 15-1-6, for color K according their arranged positions.

By performing the image data receiving process and the driving control process with such timing, the reception of useless image data and conversion to recordable data are avoided. Thus, an image can be recorded up to the edge of the recording medium 21 for each color of KCMY and also the throughput of image record can be improved.

Figure 8:
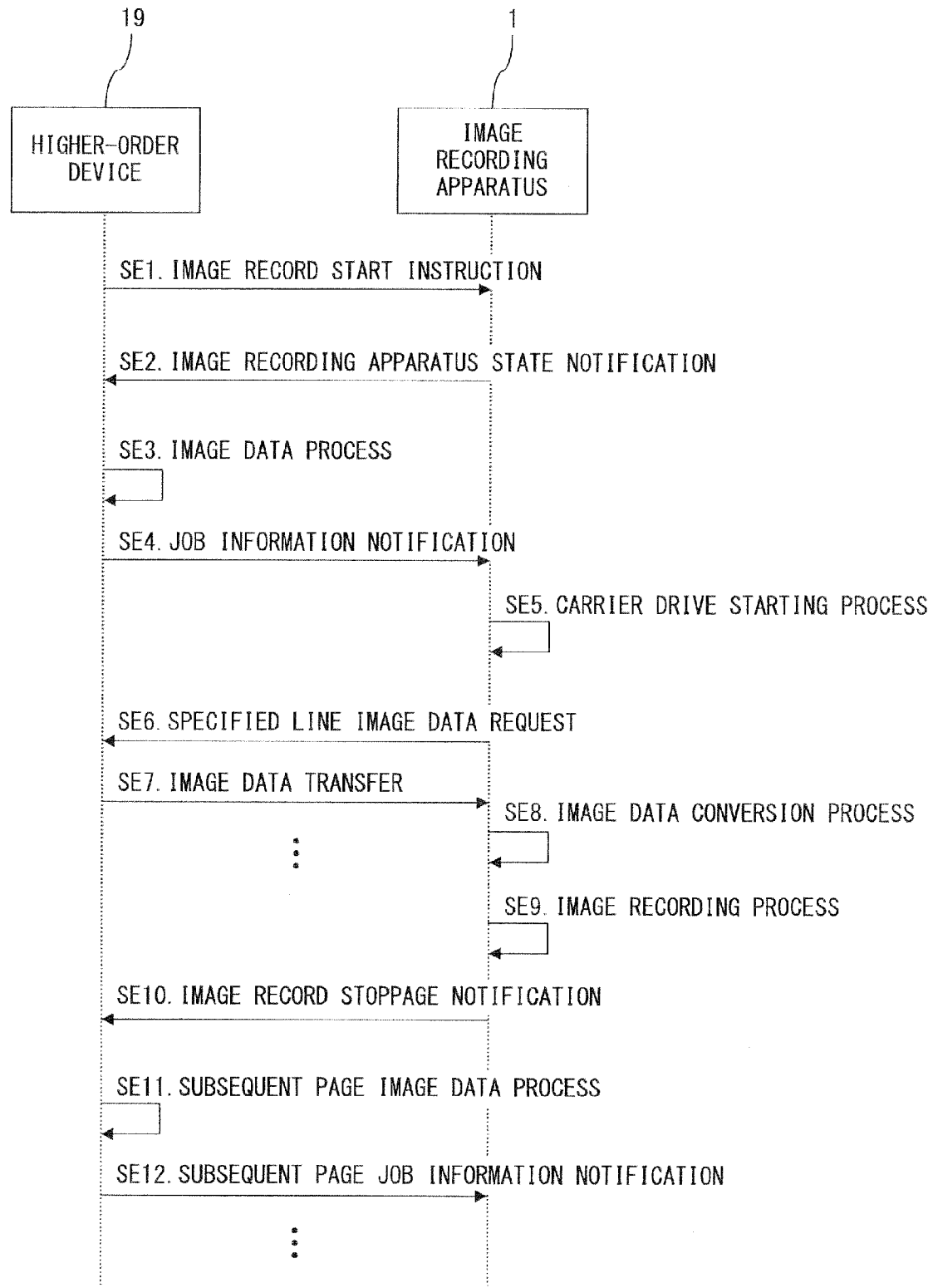
FIG. 8 is a sequence chart illustrating the concept of respective control processes performed by a higher-order device and the image recording apparatus in order to execute image record in the image recording apparatus according to the preferred embodiment of the present invention.

Next, FIG. 8 will be explained. FIG. 8 is a sequence chart illustrating the concept of the respective control processes performed by the higher-order device 19 and the image recording apparatus 1 in order to execute image record in the image recording apparatus 1 according to this preferred embodiment.

In the execution of image record, firstly, in SE1 the higher-order device 19 instructs the image recording apparatus 1 to start image record.

Upon receipt of this starting instruction, in SE2 the image recording apparatus 1 notifies the higher-order device 19 of the state of the image recording apparatus 1. The device state reported by this process includes, for example, various types of information, such as error information, such as the jam of the recording medium 21, etc., consumables information, such as a ink level, etc. and the like.

Upon receipt of this notice, in SE3 the higher-order device 19 processes image data. In this process, pseudo gradation conversion for converting multi-gradation image data composed of, for example, R, G and B to gradation values of K, C, M and Y that the image recording apparatus can output is performed. The image data to which pseudo gradation conversion is applied by this process is stored in the memory of the higher-order device 19. The capacity of this memory can be secured according to the data process speed of this process and image data transfer speed. In this preferred embodiment, since image data is transferred from the higher-order device 19 to the image recording apparatus 1 for each line, the capacity of the memory can be a minimum if these pieces of speed are sufficiently high compared with image recording speed. If these pieces of speed are low compared with the image recording speed of the recording medium 21 in the image recording apparatus 1, image can be recorded, for example, by storing image data corresponding to pages to be consecutively recorded in the memory in advance.

Then, in SE4 the higher-order device 19 notifies the image recording apparatus 1 of job information. This job information includes image record information used when recording an image on the recording medium 21. This image record information includes various types of information, such as the size, resolution and color of a record image, the address information of the memory of the higher-order device 19 storing image data and the like.

Upon receipt of this job information, in SE5 the image recording apparatus 1 starts carrier drive in order to record an image. Thus, the feeding unit 2 and the carrier mechanism 6 are controlled and the recording medium 21 starts being carried.

Upon receipt of this job information, in SE6 the image recording apparatus 1 specifies the line address (memory address) of image data and issues the transfer request for image data. This line address is calculated on the basis of the information of a line up to which the record of the image recording apparatus 1 is finished so far and the address information of the memory of the higher-order device 19, storing image data that is included in the job information.

Figure 9:
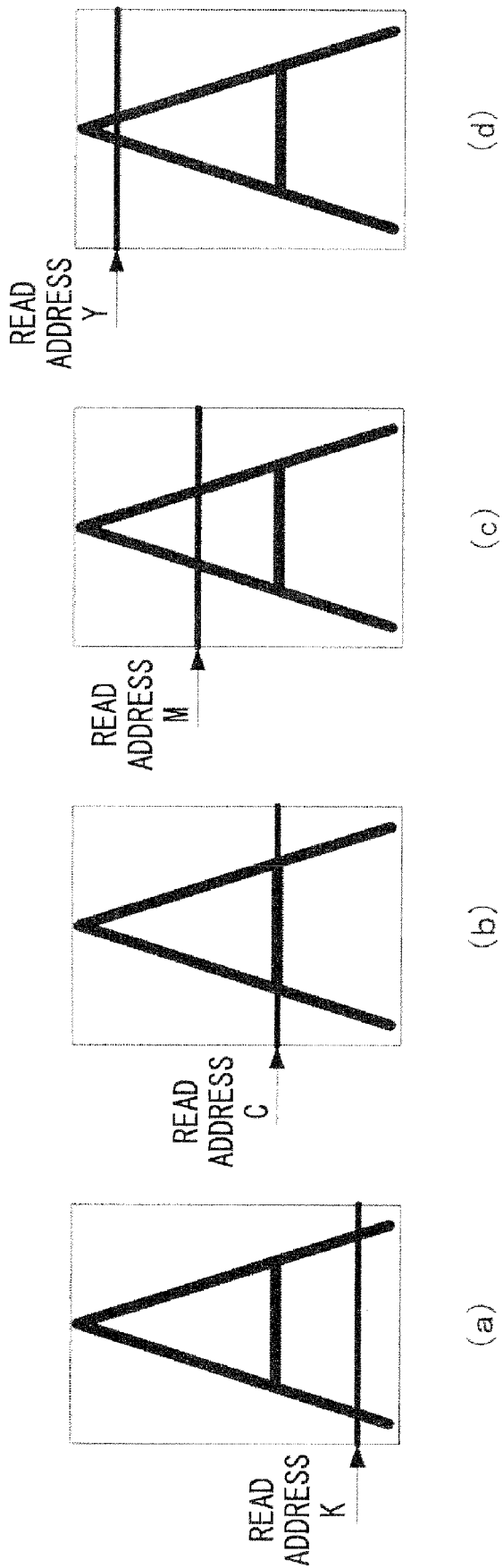
FIG. 9 is a diagram conceptually illustrating a relationship between image data after pseudo gradation conversion, stored in the higher-order device and a line address specified by the image recording apparatus.

FIG. 9 will be explained below. FIG. 9 conceptually illustrates a relationship between image data after pseudo gradation conversion, stored in the higher-order device 19 and a line address (read address) specified by the image recording apparatus 1.

The read address indicates one line of image data at the top of an image at the starting time of image record and the specified position sequentially moves downward according to the progress of image record.

In FIG. 9, (a), (b), (c) and (d) indicate the read address of image data for color K, that of image data for color C, that of image data for color M and that of image data for color Y, respectively. Thus, the control unit 16 of the image recording apparatus 1 generates a read address for each color in such a way at to indicate a deviated position according to the separated distance in the carrier direction of a nozzle array for each color.

Back to the explanation of FIG. 8, upon receipt of this transfer request, in SE7 the higher-order device 19 transfers image data to the image recording apparatus 1. The above-described pseudo gradation conversion is applied to this image data and the image data is stored in memory with a line address specified in the received transfer request.

Upon receipt of the transferred image data, after temporarily storing the received image data in the storage unit 17, in SE8 the image recording apparatus 1 converts the image data. In this image data conversion process performed by the nozzle array control unit 18, the received image data is converted to recordable data and as described above, and this process includes data distribution for each nozzle array, data position matching, record density conversion and the like.

A memory capacity in the case where the received image data is temporarily in the storage unit 17 can be secured according to the image data transfer speed. However, the image recording apparatus 1 records image according to the carrying of the recording medium 21. Therefore, when the image data transfer speed changes, it is necessary to secure a capacity sufficient to absorb the change.

Furthermore, as illustrated in FIG. 6, when adopting a configuration in which a plurality of nozzle arrays are arranged back and forth alternatively in the carrier direction, a temporary storage area is secured in order to delay record timing according to the amount of carrier direction deviation of a nozzle array.

An image is recorded for each line in synchronization with a pulse signal outputted by the carrier information generation unit 8 according to the carrying of the recording medium 21. However, if the received image data is temporarily stored in the storage unit 17, it is not always to synchronize the image data transfer process and the image data conversion process with an encoder signal nor to record an image for each line.

Although in the above-described preferred embodiment, the higher-order device 19 performs pseudo gradation conversion, the image recording apparatus 1 can also perform the pseudo gradation conversion as long as image data is transferred in a similar way to for each line.

Then, in SE9 the image recording apparatus 1 injects ink from the nozzle arrays and records one line of images on the recording medium 21.

After the completion of this one line of images, the process sequence from SE6 through SE9 is repeated for each line.

Then, when the recording medium detection unit 5 detects the carrier back end of the recording medium 21, in SE10 the image recording apparatus 1 notifies the higher-order device 19 of the stoppage of image record.

Upon receipt of this stoppage notice, in SE11 the higher-order device 19 applies the same image data process as SE3 to the image data of a subsequent page.

Then, in SE12 the higher-order device 19 notifies the image recording apparatus 1 of the job information of the image data of the subsequent page in the same way as in SE4.

Then, the process sequence from SE5 through SE12 is repeated for each page.

Figure 10:
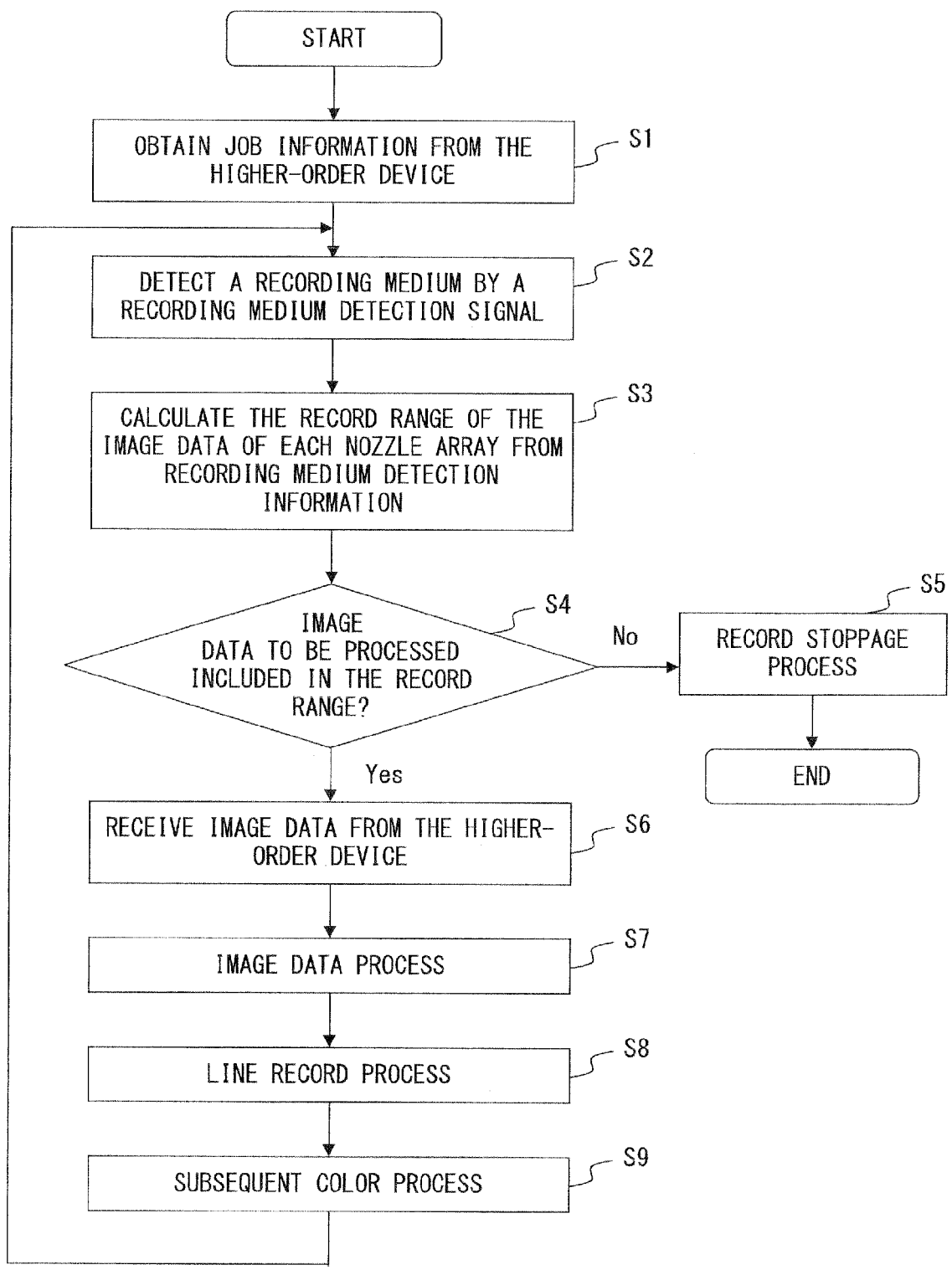
FIG. 10 is a diagram illustrating the process contents of a control process performed by the control unit in order to execute image record in the image recording apparatus according to the preferred embodiment of the present invention.

Next, FIG. 10 will be explained below. FIG. 10 illustrates the process contents of a control process performed by the control unit 16 in order to execute image record in the image recording apparatus 1 according to this preferred embodiment.

The process illustrated in FIG. 10 is realized by an MPU reading and executing a control program stored in non-volatile memory, which is not illustrated in FIG. 1, of the control unit 16 in advance. The control unit 16 also functions as the nozzle array control unit 18 by the MPU executing this control program.

Firstly, in step S1 the control unit 16 obtains job information from the higher-order device 19 and stores it in the storage unit 17.

Processes in steps S2 through S9 are repeated for image data (line data) to be recorded.

Firstly, in step S2 the control unit 16 obtains the size (Y-direction recording medium length) of the recording medium 21 from a detection signal transmitted from the recording medium detection unit 5. In this process, the Y-direction recording medium length is obtained by multiplying a period time indicating that the recording medium 21 is detected by the detection signal by the carrier speed of the recording medium 21.

Then, in step S3 the control unit 16 calculates the image data record range of each nozzle array. This record range is calculated on the basis of the Y-direction recording medium length obtained by the process in step S2, Y-direction image data length included in the job information stored in the storage unit 17 and the arranged position information in the carrier direction of each nozzle array stored in the storage unit 17 in advance.

Then, in step S4 the control unit 16 determines whether the image data (line data) to be subsequently recorded is included in the record range calculated by the process in step S3. If the control unit 16 determines that the image data is included in the record range (the determination result is Yes), the process advances to step S6. If the control unit 16 determines that the image data is out of the record range (the determination result is No), the process advances to step S5 and recording on the recording medium 21 is stopped. Then, this control process is terminated. When in step S4 the record of all pieces of image data to be recorded is completed too, the process advances to step S5, and the control unit 16 stops recording an image on the recording medium 21 and this control process is terminated.

However, in step S6, the control unit 16 receives, from the higher-order device 19, the image data (line data) to be subsequently recorded.

Then, in step S7, the control unit 16 applies predetermined image data conversion to the received image data. As described above, this process includes various processes, such as data distribution for each nozzle array, data position matching, record density conversion and the like.

Then, in step S8, the control unit 16 drives the nozzle arrays 15-*n*-1 through 15-*n*-*m* and records an image on the recording medium 21 on the basis of the image data to which image data conversion is applied by the process in step S7.

Then, in step S9, the control unit 16 applies the processes in steps S2 through S8 to image data for another color on the same line to which image record is applied by the process in step S8. The image record for all colors (K, C, M and Y) of the image data on the same line is performed by performing the process in step S9 following the processes in steps S2 through S8.

Then, after finishing the process in step S9, the process returns to step S2 and the control unit 16 applies image record to image data on a subsequent line.

By the control unit 16 performing the above-described processes, an image is recorded on the recording medium 21 by the image recording apparatus 1 and the image is recorded up to the edge of the recording medium 21. In this recording process, the reception of useless image data from the higher-order device 19 and conversion from this image data to recordable data are omitted. Therefore, the through put of image record can be improved.

Although in the control process illustrated in FIG. 10, image record is sequentially performed for each color, these pieces of image record can be also performed for each color in parallel by providing a dedicated control unit 16 for each color.

The present invention is not limited to the above-described preferred embodiments and actually can be variously modified as long as it subject matter is not departed.

What is claimed is:

1. An image recording apparatus comprising:
a carrier mechanism which comprises a carrier information generation unit which generates a number of pulse signals according to a carried distance of a recording medium transferred from an upper stream side of a carrier route toward a lower stream side; and
at least one recording unit which comprises a nozzle array driving unit and at least one nozzle array formed of a plurality of nozzles in a direction orthogonal to a carrier direction of the recording medium, wherein the image recording apparatus records an image by driving the plurality of nozzles and injecting ink based on image data every time the image recording apparatus receives one line of image data transferred from a higher-order device;
a recording medium detection unit which is provided on an upper stream side of the carrier mechanism in the carrier route, and which detects at least a front end and a back end of the recording medium in the carrier direction;
a nozzle array control unit which controls the plurality of nozzles based on job information received from the higher-order device and based on detection of the front end and the back end of the recording medium by the recording medium detection unit, so as to inject the ink to only an area in a range between the front end and the back end of the recording medium; and
a control unit which receives the image data and which notifies the higher-order device of transfer stoppage of one or more lines of the image data of a page being processed by the nozzle array control unit according to the detection of the back end of the recording medium by the recording medium detection unit.

2. The image recording apparatus according to claim 1, wherein:
the control unit applies a predetermined image data conversion process to the received image data only when receiving the image data from the higher-order device, so as to convert the received image data to recordable data, and
the nozzle array control unit controls the plurality of nozzles based on the recordable data that has been distributed for each nozzle array.

3. The image recording apparatus according to claim 1, wherein the carrier mechanism carries recording media in such a way that each back end in the carrier direction of a previously carried recording medium and each front end in the carrier direction of a subsequently carried recording medium are located at equal intervals when consecutively carrying the recording media whose sizes in the carrier direction are different.

4. The image recording apparatus according to claim 1, wherein the control unit issues a transfer request for image data to be subsequently recorded every time one line of a recording process based on the image data is completed until the recording medium detection unit detects the back end of the recording medium after detecting the front end.

5. The image recording apparatus according to claim 1, wherein the control unit:
calculates a record range of the image on the recording medium as to each of a plurality of nozzle arrays based on: (i) a size in the carrier direction of an image indicated by the job information received from the higher-order device, and (ii) a length of the recording medium in the carrier direction obtained by multiplying a period while the recording medium is being detected by the recording medium detection unit and a carrier speed of the recording medium by the carrier mechanism,
determines whether the image data used by each of the plurality of nozzles to control subsequent injection of the ink is included in the record range as to each of the plurality of nozzles, and
controls the nozzle array control unit in such a way as to stop injecting the ink as to a nozzle as to which it is determined that the image data is not included in the record range.

6. A method for controlling the image recording apparatus of claim 1, the method comprising:
controlling the recording medium detection unit to detect at least the front end and the back end of the recording medium in the carrier direction on the upper stream side of the carrier mechanism in the carrier route;
controlling the control unit to receive the image data;
controlling the nozzle array control unit to control the plurality of nozzles based on the job information received from the higher-order device and based on the detection of the front end and the back end of the recording medium by the recording medium detection unit and the received image data, so as to inject the ink to only the area in the range between the front end and the back end of the recording medium; and
controlling the control unit to notify the higher-order device of the transfer stoppage of the one or more lines of the image data of the page being processed by the nozzle array control unit, according to the detection of the back end of the recording medium by the recording medium detection unit.

7. The control method according to claim 6, further comprising:
controlling the control unit to perform a predetermined image data conversion process to the received image data only when receiving the image data from the higher-order device, so as to convert the received image data to recordable data, and
controlling the nozzle array control unit to drive the plurality of nozzles based on the recordable data that has been distributed for each nozzle array.

8. The control method according to claim 6, further comprising controlling the carrier mechanism so as to carry recording media in such a way that each back end in the carrier direction of a previously carried recording medium and each front end in the carrier direction of a subsequently carried recording medium are located at equal intervals when consecutively carrying the recording media whose sizes in the carrier direction are different.

9. The control method according to claim 6, further comprising controlling the control unit to issue a transfer request for image data to be subsequently recorded every time one line of a recording process based on the image data is completed until the back end of the recording medium is detected by the recording medium detection unit after the front end is detected.

10. The control method according to claim 6, further comprising controlling the control unit to:
calculate a record range of the image on the recording medium as to each of a plurality of nozzle arrays based on: (i) a size in the carrier direction of an image indicated by the job information received from the higher-order device, and (ii) a length of the recording medium in the carrier direction obtained by multiplying a period while the recording medium is being detected by the recording medium detection unit and a carrier speed of the recording medium by the carrier mechanism;
determine whether the image data used by each of the plurality of nozzles to control subsequent injection of the ink is included in the record range as to each of the plurality of nozzles; and
control in such a way as to stop injecting the ink as to a nozzle as to which it is determined the image data is not included in the record range.

11. A non-transitory computer-readable storage medium having stored thereon a program to control the image recording apparatus of claim 1, the program being executable by a computer of the image recording apparatus to perform processes comprising:
controlling the recording medium detection unit to detect at least the front end and the back end of the recording medium in the carrier direction on the upper stream side of the carrier mechanism in the carrier route;
controlling the control unit to receive the image data;
controlling the nozzle array control unit to control the plurality of nozzles based on the job information received from the higher-order device and based on the detection of the front end and the back end of the recording medium by the recording medium detection unit and the received image data, so as to inject the ink to only the area in the range between the front end and the back end of the recording medium; and
controlling the control unit to notify the higher-order device of the transfer stoppage of the one or more lines of the image data of the page being processed by the nozzle array control unit, according to the detection of the back end of the recording medium by the recording medium detection unit.

12. The non-transitory computer-readable storage medium according to claim 11, further comprising:
   controlling the control unit to perform a predetermined image data conversion process to the received image data only when receiving the image data from the higher-order device, so as to convert the received image data to recordable data, and
   controlling the nozzle array control unit to drive the plurality of nozzles based on the recordable data that has been distributed for each nozzle array.

13. The non-transitory computer-readable storage medium according to claim 11, further comprising controlling the carrier mechanism so as to carry recording media in such a way that each back end in the carrier direction of a previously carried recording medium and each front end in the carrier direction of a subsequently carried recording medium are located at equal intervals when consecutively carrying the recording media whose sizes in the carrier direction are different.

14. The non-transitory computer-readable storage medium according to claim 11, further comprising controlling the control unit to issue a transfer request for image data to be subsequently recorded every time one line of a recording process based on the image data is completed until the back end of the recording medium is detected by the recording medium detection unit after the front end is detected.

15. The non-transitory computer-readable storage medium according to claim 11, further comprising controlling the control unit to:
   calculate a record range of the image on the recording medium as to each of a plurality of nozzle arrays based on: (i) a size in the carrier direction of an image indicated by the job information received from the higher-order device, and (ii) a length of the recording medium in the carrier direction obtained by multiplying a period while the recording medium is being detected by the recording medium detection unit and a carrier speed of the recording medium by the carrier mechanism;
   determine whether the image data used by each of the plurality of nozzles to control subsequent injection of the ink is included in the record range as to each of the plurality of nozzles; and
   control in such a way as to stop injecting the ink as to a nozzle as to which it is determined the image data is not included in the record range.

* * * * *